US010958502B2

(12) United States Patent
Ramachandran et al.

(10) Patent No.: US 10,958,502 B2
(45) Date of Patent: Mar. 23, 2021

(54) PORT MAPPING

(71) Applicant: Comcast Cable Communications, LLC, Philadelphia, PA (US)

(72) Inventors: Balasubramanian Ramachandran, Mount Laurel, NJ (US); Eric Frishman, Wayne, PA (US); Mannan Venkatesan, Marlton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/246,014

(22) Filed: Jan. 11, 2019

(65) Prior Publication Data

US 2019/0215228 A1 Jul. 11, 2019

Related U.S. Application Data

(60) Provisional application No. 62/616,197, filed on Jan. 11, 2018.

(51) Int. Cl.
*H04L 29/12* (2006.01)
*H04L 29/06* (2006.01)
*H04L 29/08* (2006.01)

(52) U.S. Cl.
CPC .. *H04L 29/12377* (2013.01); *H04L 29/12367* (2013.01); *H04L 61/2517* (2013.01); *H04L 67/04* (2013.01); *H04L 67/2833* (2013.01); *H04L 69/162* (2013.01)

(58) Field of Classification Search
CPC ............... H04L 67/04; H04L 61/2517; H04L 29/12367; H04L 29/12377; H04L 69/162; H04L 67/2833
See application file for complete search history.

(56) References Cited

U.S. PATENT DOCUMENTS

| | | | |
|---|---|---|---|
| 2011/0142079 A1* | 6/2011 | Wong | H04L 41/5009 370/503 |
| 2016/0330080 A1* | 11/2016 | Bhatia | H04L 41/12 |
| 2018/0205750 A1* | 7/2018 | Kohout | H04L 63/1425 |

* cited by examiner

*Primary Examiner* — Kevin C. Harper
*Assistant Examiner* — Henry Baron
(74) *Attorney, Agent, or Firm* — Banner & Witcoff, Ltd.

(57) ABSTRACT

Systems, apparatuses, and methods are described for auto-discovery of port-to-port connectivity through correlative analysis on performance metrics. Statistical data corresponding to each port of routers and transport devices may be collected. The collected data may be processed such that missing data may be patched and time frames may be aligned. Statistical analysis may be performed on the collected data. Such statistical analysis may comprise generating a waveform based on the data and determining, e.g., correlations in the data. If the analyzed data of one port matches analyzed data of another port, the two ports may be determined to be connected to one another. A match may be based on meeting various criteria and/or thresholds.

20 Claims, 11 Drawing Sheets

| Group | 12:00 -12:15 | 12:15 – 12:30 | 12:30 -1:00 |
|---|---|---|---|
| Transport Device 304; Port 3 TimeStamp Average Packet Count per Second | 12:15 300000 | 12:30 3000 | 12:45 8000 |
| Router 152; Port 3 TimeStamp Average Packet Count per Second | 12:05  12:10  12:15<br>10000  1000   1000 | 12:20  12:25  12:30<br>2000   1000   2000 | 12:35  12:40  12:45<br>4000   4000   4000 |

FIG. 5

| Port ID | Rank | Corr | Sum | Delta Sum | Min Traffic |
|---|---|---|---|---|---|
| Router 152; Port 3 | Selected | Selected | 1,720,000,000 | Selected | 1 |
| Transport Device 304; Port 3 | 1 | 0.999 | 1,720,000,000 | 0.001 | 1 |
| Transport Device 304; Port 4 | 2 | 0.998 | 1,670,000,000 | -5.310 | 1 |
| Router 302, Port 3 | 3 | 0.970 | 1,990,000,000 | 0.838 | 1 |
| Router 302; Port 4 | 4 | 0.965 | 1,760,000,000 | 0.710 | 1 |
| Transport Device 308; Port 3 | 5 | 0.964 | 1,990,000,000 | 0.869 | 1 |
| Transport Device 308; Port 4 | 6 | 0.963 | 1,760,000,000 | 0.835 | 1 |

FIG. 7

PORT MAPPING

BACKGROUND

In some networks, two routers may be located at a great distance away from one another. For example, one router may be located on the east coast of the United States (e.g., in Boston) and the other router may be located on the west coast of the United States (e.g., in San Francisco). In order to transmit messages between the two routers, the routers may relay communications over long distances to one another via a transport network. Furthermore, on such a transport network, different routers and transport devices may be connected using different ports. For example, port 5 of a router may be connected to port 3 of a transport device. Technicians may document such port-to-port mappings of a transport network, but such documentation may become lost, outdated, and/or erroneous, particularly as the network is updated and reconfigured.

SUMMARY

The following presents a simplified summary in order to provide a basic understanding of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Systems, apparatuses, and methods may provide for auto-discovery of port-to-port connectivity through correlative analysis on performance metrics. A system may monitor ports of routers and/or transport devices by, e.g., collecting traffic statistics on each port of the routers and the transport devices. The system may collect the monitored data and/or otherwise group the data to be collected over a configurable preset time period at a configurable interval (e.g., every 15 minutes). The collected traffic statistics for a particular interval may be referred to as a segment. If statistical data is missing for a particular interval, the system may replace the null value (e.g., the missing data) with other data collected from another port of another device. The system may also align the time frames of the collected data to ensure that the comparisons made between the collected data of one port and collected data of another port are for the same time frame. The system may perform statistical analysis on the collected traffic statistics including, for example, generating a waveform based on the statistical data and determining correlations in the statistical data as well as other metrics. If the analyzed data of one port matches analyzed data of another port, the system may determine that the two ports are connected to one another. A match may be based on meeting various criteria and/or thresholds.

These features in the summary above are merely examples of the features described in greater detail below, and are not intended to recite the only novel features or critical features in the claims.

BRIEF DESCRIPTION OF THE DRAWINGS

Some features herein are illustrated by way of example, and not by way of limitation, in the accompanying drawings. In the drawings, like numerals reference similar elements between the drawings.

FIG. 5 shows an example table grouping of segments to align time frames.
FIG. 7 shows an example table of a portion of results of statistical analysis.

DETAILED DESCRIPTION

Figure 1:
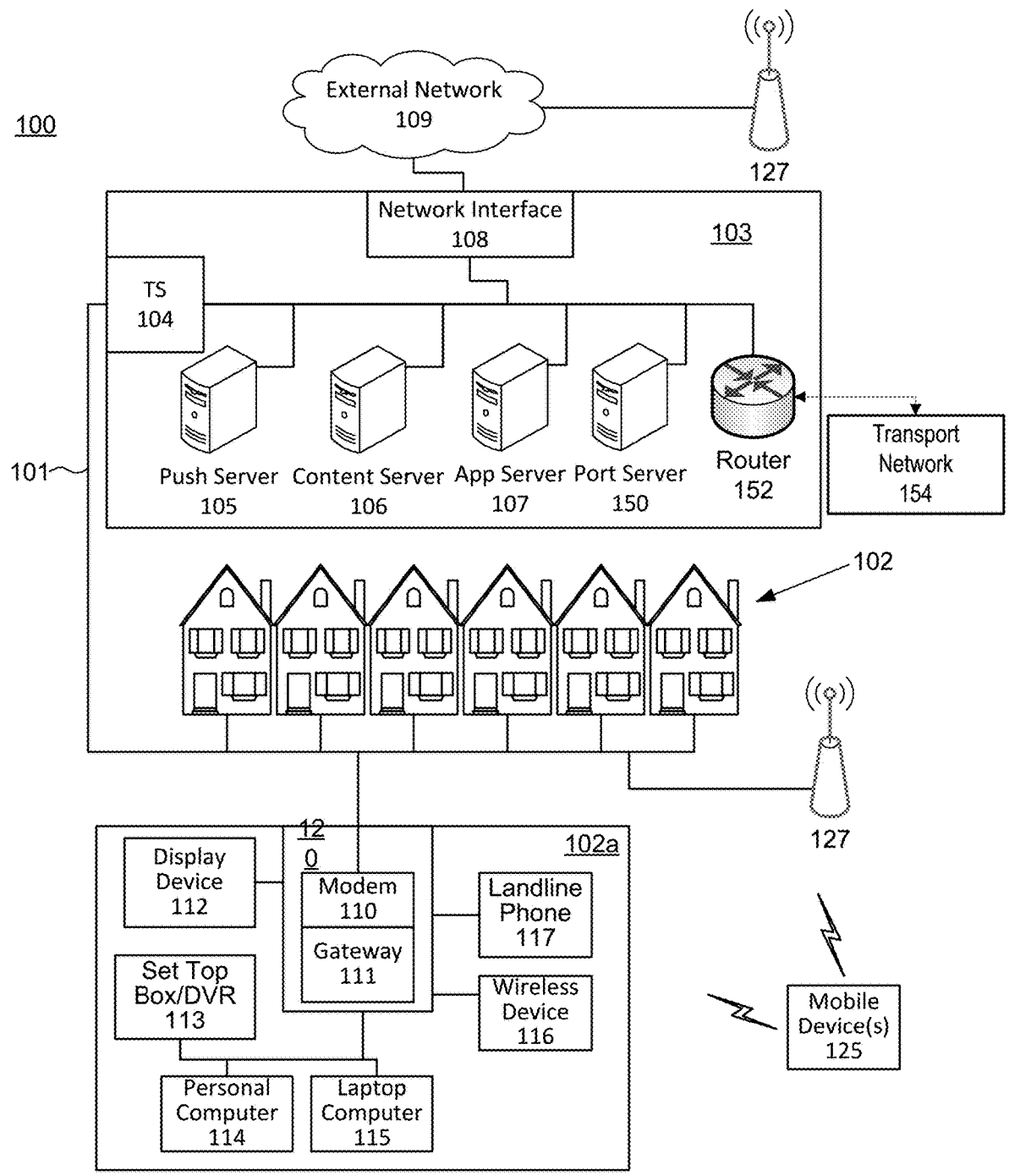
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured manage communications among those devices, to manage communications between those devices and backend devices such as servers 105-107, and 150, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may collect, and generate a download of, information for electronic program guide listings. Another application server may monitor user viewing habits and collecting information from that monitoring for use in selecting advertisements. Yet another application server may format and insert advertisements in a video stream being transmitted to devices in the premises 102 and/or to the mobile devices 125. The local office 103 may comprise additional servers, such as the port server 150 (described below), additional push, content, and/or application servers, and/or other types of servers. Although shown separately, the push server 105, the content server 106, the application server 107, the port server 150, and/or other server(s) may be combined. The servers 105, 106, 107, and 150, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

The local office 103 may also comprise a port server 150, which may auto-discover port-to-port connectivity through correlative analysis on performance metrics, and may be configured to perform one or more of the steps described in FIGS. 4A-4E discussed below. The port server 150 may maintain port-to-port mappings of multiple ports. Such port-to-port mappings may indicate connections between ports of different devices, which specify which port of a device is connected to which port of another device, and so on. Such ports may be physical interfaces of different devices, such as Ethernet ports, fiber optic connections, or the like. Such ports may additionally or alternatively comprise logical ports, such as ports defined in Transmission Control Protocol/Internet Protocol (TCP/IP) networking. A logical connection need not be a direct link between two ports. Instead, the two ports may be known to be connected and assigned to one another via other intermediate devices. Such devices may have one or more ports, which may be identified by, e.g., a number. The port-to-port mappings may thereby correlate a physical interface of a first device (e.g., port A of device A) with a different physical interface of a second device (e.g., port C of device B). The port server 150 may provide a graphical user interface to a technician to configure and/or view one or more aspects described herein.

The local office 103 may also comprise a router 152, which may relay communications between devices (e.g., app servers 107 of various local offices 103), and possibly through one or more other intermediary routers. The router 152 and another router (e.g., a router of another local office) may be located at a great distance away from one another. For example, the router 152 may be located on the east coast (e.g., in Boston) and the other router may be located on the west coast (e.g., in San Francisco). In order to transmit messages between the two routers, the router 152 and the other router may relay communications to one another via a transport network 154. The transport network 154 may relay communications between routers located at great distances from one another. The transport network 154 may be an optical network having transport devices interconnected with one another via optical fibers.

Figure 2:
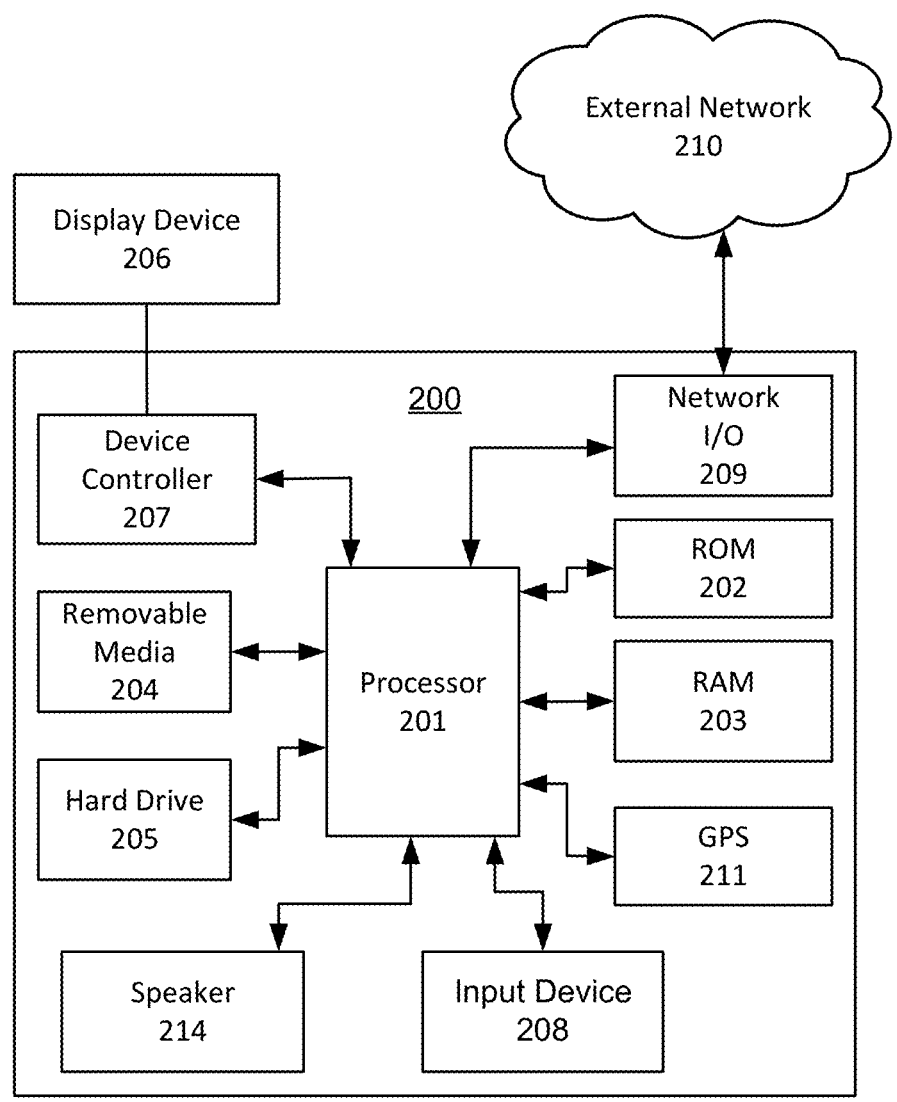
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102*a*, any of the devices shown in the local office 103, any of the wireless access points 127, any devices with the external network 109) and any other computing devices discussed herein (e.g., the port server 150, the router 152, and/or devices communicatively coupled to the transport network 154). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. The elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. An IC may be configured to output image data to a display buffer.

Figure 3:
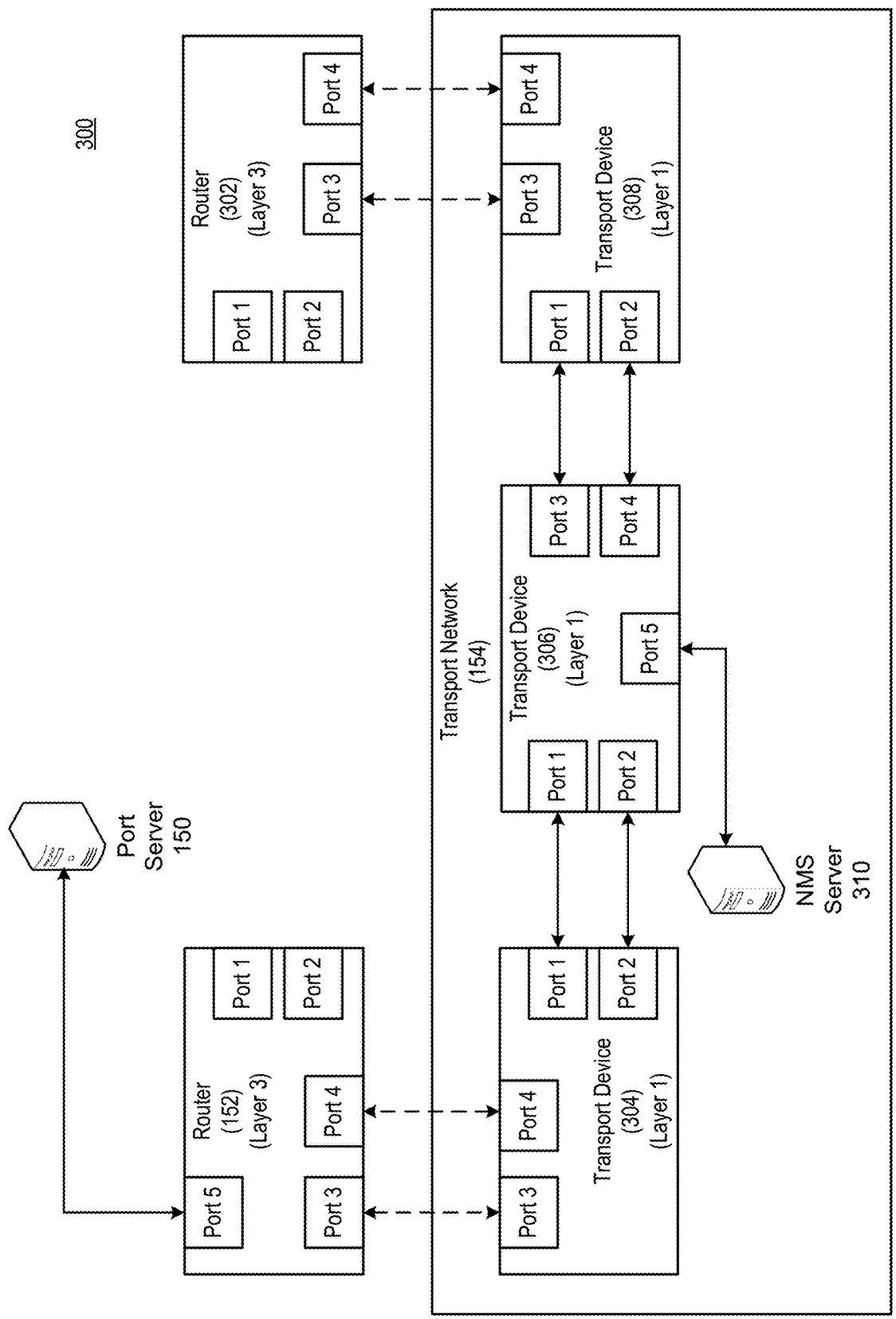
FIG. 3 shows an example router and transport system.

FIG. 3 shows an example router and transport system 300. The transport system 300 may comprise multiple routers 152, 302 which may relay communications between devices (e.g., servers, routers, transport devices). While FIG. 3 shows two routers 152, 302 and three transport devices 304-308 for purposes of illustration, the transport system 300 need not have any particular number of routers and/or transport devices. For example, two routers may be directly connected, and/or a large quantity of transport devices may effectuate communications between a large quantity of routers. Each of routers 152, 302 may route communications between itself and other nearby routers or devices (e.g., routers or servers within the same local office). For example, port 1 of the router 152 may be connected via a link with a port of another router or device (not shown) in the same local office (e.g., local office 103). The link itself (e.g., the connection) between the two ports may be a wired electrical connection (e.g., a coaxial cable, Ethernet cable, RJ45 cable, etc.) and messages may be communicated in the form of electrical signals. The messages may be segmented into one or more Internet Protocol (IP) packets and the ports may be Ethernet ports. The link may be a wireless (e.g., satellite or cellular) communication link and/or may be a combination of wired and wireless links. Routers 152, 302 may comprise one or more of the component and functionalities of computing device 200 shown in FIG. 2.

The routers 152, 302 may be located a great distance from one another (e.g., router 152 may be located in Boston and router 302 may be located in San Francisco), and each of the routers 152, 302 may be part of a different local office. To transmit messages between the two routers 152, 302, the router 152 and the router 302 may relay communications via the transport network 154. The first router 152 may comprise multiple ports to form connections via the transport network 154 with ports of the second router 302. For example, port 3 of router 152 may be connected via the transport network with port 3 of router 302.

The transport network 154 may relay communications between routers 152, 302 and may comprise multiple transport devices 304-308. Each of the transport devices 304-308 may relay communications between devices (e.g., servers, routers, transport devices) in a similar manner as the routers 152, 302. Each of the transport devices 304-308 may comprise multiple ports to form connections with ports of other devices. For example, port 3 of the transport device 304 may be connected via a link to port 3 of router 152. As another example, port 1 of the transport device 304 may be connected via a link to port 1 of transport device 306. Transport devices 304-308 may comprise one or more of the component and functionalities of computing device 200.

At least some of the routers (e.g., routers 152, 302) and transport devices (e.g., transport devices 304, 308) may translate electrical signals to optical signals, and vice-versa. Links (e.g., connections) connecting a port of a router with a port of a transport device may be an optical fiber, and messages communicated on these links may be in the form of an optical signal. For example, the connection between port 3 of router 152 and port 3 of transport device 304 may be an optical fiber. Because a router (e.g., the router 152)

may receive an electrical signal from a nearby router or server, the router may translate the electrical signal to an optical signal and output the optical signal to a transport device (e.g., transport device 304). Similarly, a router (e.g., router 302) may receive the optical signal from a transport device (e.g., transport device 308) and the router may translate the optical signal back to the electrical signal and output the electrical signal to nearby routers and/or servers. After a transport device (e.g., the transport device 304) receives an optical signal from a router (e.g., router 152), the transport device may perform optical-to-electrical-to-optical (OEO) translation and relay the optical signal to the next appropriate transport device (e.g., transport device 306), which may, in turn, relay the optical signal to the next appropriate transport device (e.g., transport device 308), and so on until the optical signal is relayed to another router (e.g., router 302). An OEO translation may also be performed by a transport device (e.g., transport device 308) that intends to send an optical signal to a router (e.g., the router 302). One or more of the transport devices (e.g., transport device 306) might not have any direct port connections with the routers 152, 302 and may relay messages between transport devices 304, 308 over the optical links.

Each port may form a connection with only one other port at a given instance in time. For example, while port 3 of router 152 is connected via an optical fiber with port 3 of transport device 304, port 3 of router 152 might not be connected with any other port (e.g., port 4 of transport device 304).

A port may have a forward direction, a reverse direction, or both. A port may have a forward direction if the port is used to either exclusively or predominantly transmit packet data to other devices. A port may have a reverse direction if the port is used to either exclusively or predominantly receive packet data from other devices. A port may have both a forward and reverse directions if the port is used both to transmit packet data to other devices and receive packet data from other devices.

A first server (e.g., the server 107) at a first local office (e.g., local office 103) may wish to transmit a message to a second server at a second local office. The first server may be communicatively connected to a port 1 of router 152 and the second server may be communicatively connected to a port 1 of router 302. The first server may transmit the message in the form of an electrical signal to router 152, which, in turn, may translate the electrical signal to an optical signal and relay the optical signal to transport device 304 by outputting the optical signal on port 3. Port 3 of the transport device 304 may receive the optical signal and perform an OEO translation. The transport device 304 may then output the optical signal on port 1. Port 1 of the transport device 306 may receive the optical signal and output the optical signal on port 3. Port 1 of the transport device 308 may receive the optical signal and perform an OEO translation. The transport device 308 may then output an optical signal on port 3, which, in turn, may be received by port 3 of the router 302. The router 302 may then translate the optical signal back to an electrical signal and output the electrical signal on port 1 to the second server. Communications from the second server to the first server may be communicated in a similar manner but in the other direction using other ports. By using the transport network 154, messages may be transmitted between the two servers, which may be located a great distance from one another.

The transport system 300 may comprise the port server 150, which may auto-discover port-to-port connectivity through correlative analysis on performance metrics, and may be configured to perform one or more of the steps described in FIGS. 4A-4E. The port server 150 may instruct other devices to monitor various ports, collecting traffic data, patching missing data, analyzing the traffic data, and mapping ports to other ports based on the analysis. The port server 150 may maintain port-to-port mappings for each port of the routers 152, 302 and transport devices 304-308. The mappings may be in the form of a table, and account for each port of the routers 152, 302 and the transport devices 304-308. A mapping may specify which port of one device (e.g., routers 152, 302; transport devices 304-308) is connected to which port of another device (e.g., routers 152, 302; transport devices 304-308). The mapping may also specify, for each port, a link type and whether the port has a forward direction, reverse direction, or both. If a port is not connected to another port, the mapping may indicate that the port is not connected to another port. An example of such a mapping of physical ports is provided below as Table 1 and as based on FIG. 3 (wherein dashed lines depict unknown connections). Additional logical ports (not shown in Table 1) may be similarly mapped such that, for example, TCP/IP ports may be included in the mapping.

TABLE 1

| Device | Port | Device | Port |
|---|---|---|---|
| Router 152 | 1 | Disconnected | |
| Router 152 | 2 | Disconnected | |
| Router 152 | 3 | Unknown | |
| Router 152 | 4 | Unknown | |
| Router 152 | 5 | Port Server 150 | Unknown |
| Router 302 | 1 | Disconnected | |
| Router 302 | 2 | Disconnected | |
| Router 302 | 3 | Unknown | |
| Router 302 | 4 | Unknown | |
| Transport Device 304 | 1 | Transport Device 306 | 1 |
| Transport Device 304 | 2 | Transport Device 306 | 2 |
| Transport Device 304 | 3 | Unknown | |
| Transport Device 304 | 4 | Unknown | |
| Transport Device 308 | 1 | Transport Device 306 | 3 |
| Transport Device 308 | 2 | Transport Device 306 | 4 |
| Transport Device 308 | 3 | Unknown | |
| Transport Device 308 | 4 | Unknown | |
| Transport Device 306 | 5 | NMS Server | Unknown |

If a port's mapping to another port is unknown, the port server 150 may collect traffic data, analyze traffic data, map the port based on the analyzed traffic data, and the determined mapping may be added to the mapping table. The port server 150 may be connected via a link to at least one (or all) of the routers 152, 302. For example, the port server 150 may be connected via a link to port 5 of router 152 and might not be directly connected to a port of router 302. Instead, the port server 150 may access the router 302 via router 152 and the transport network 154. The port server 150 may be directly connected via two links to ports of routers 152, 302. By using these direct connections and/or indirect connections, the port server 150 may individually address each of the routers 152, 302 and provide each of the routers 152, 302 with its own instructions, which may be different from instructions provided to the other router. As will be discussed in detail below, the routers 152, 302 may provide port traffic statistics to the port server 150.

The port server 150 may also be connected via a network (e.g., the Internet) to a network management system (NMS) server 310 of the transport network 154. The NMS server 310 may monitor traffic through ports of the transport devices 304-308, catalog such traffic data, and/or transmit such traffic data to the port server 150. The NMS server 310 may also maintain network topology of the transport network 154 and maintain a port-to-port mapping for at least some of the ports of the transport devices 304-308. The NMS server 310 may provide a website accessible by a technician using the port server 150.

The NMS server 310 may be connected to one or more (or all) of the transport devices 304-308. The NMS server 310 may be connected via a link to port 5 of transport device 306 and might not be directly connected to a port of the transport devices 304, 308. Instead, the NMS server 310 may access the transport devices 304, 308 via the transport device 306. The NMS server 310 may be directly connected via three links to ports of the transport devices 304-308. By using these direct connections and/or indirect connections, the NMS server 310 may individually address each of the transport devices 304-308 and provide each of the transport devices 304-208 with its own instructions. The port server 150 may be connected to the NMS server 310 via routers (e.g., the router 152) and transport devices (e.g., the transport devices 304, 306).

The transport system 300 may comprise multiple NMS servers (not shown), with each of the NMS servers managing different transport devices. For example, NMS server 310 may manage the transport devices 304, 306. Another NMS server (now shown) may manage transport device 308.

The port server 150 may know the port-to-port mappings for some of the ports of the routers 152, 302 and the transport devices 304-308. However, the port-to-port mapping for other ports of the routers 152, 302 and the transport devices 304-308 may be unknown by the port server 150 and the NMS server 310. In FIG. 3, the port-to-port mapping for ports connected by links having solid lines may be known, and the port-to-port mapping for ports connected by links having dashed lines may be unknown. For example, the port-to-port mappings for each direct connection between the transport devices 304-308 may be known and labeled as direct connections in the mapping table. For example, the mapping of port 1 of transport device 304 to port 1 of transport device 306, the mapping of port 2 of transport device 304 to port 2 of transport device 306, the mapping of port 3 of transport device 306 to port 1 of transport device 308, and the mapping of port 4 of transport device 306 to port 2 of transport device 308 may be known. For example, logical connections may be known, which may also be included in the port-to-port mapping table.

FIGS. 4A-4E shows example flow diagrams for determining port-to-port connectivity in the router and transport system 300. The steps of the FIG. 4A may be performed by port server 150 and be embodied in computer executable instructions that, when executed by a processor of port server 150, cause the port server 150 to perform the steps of FIGS. 4A-4E. The steps of FIGS. 4A-4E may be performed in any order, and one or more of the steps may be omitted. For example, the system depicted in FIG. 3 and Table 1 may be known, but the connections depicted by dashed lines (particularly, those between the router 152 and the transport device 304, as well as those between the router 302 and the transport device 308) may be unknown. Moreover, mapping information (e.g., that depicted in Table 1) may be antiquated or incorrect, such that the method shown in FIGS. 4A-4E may be performed to determine any inaccuracies.

Figure 4A:
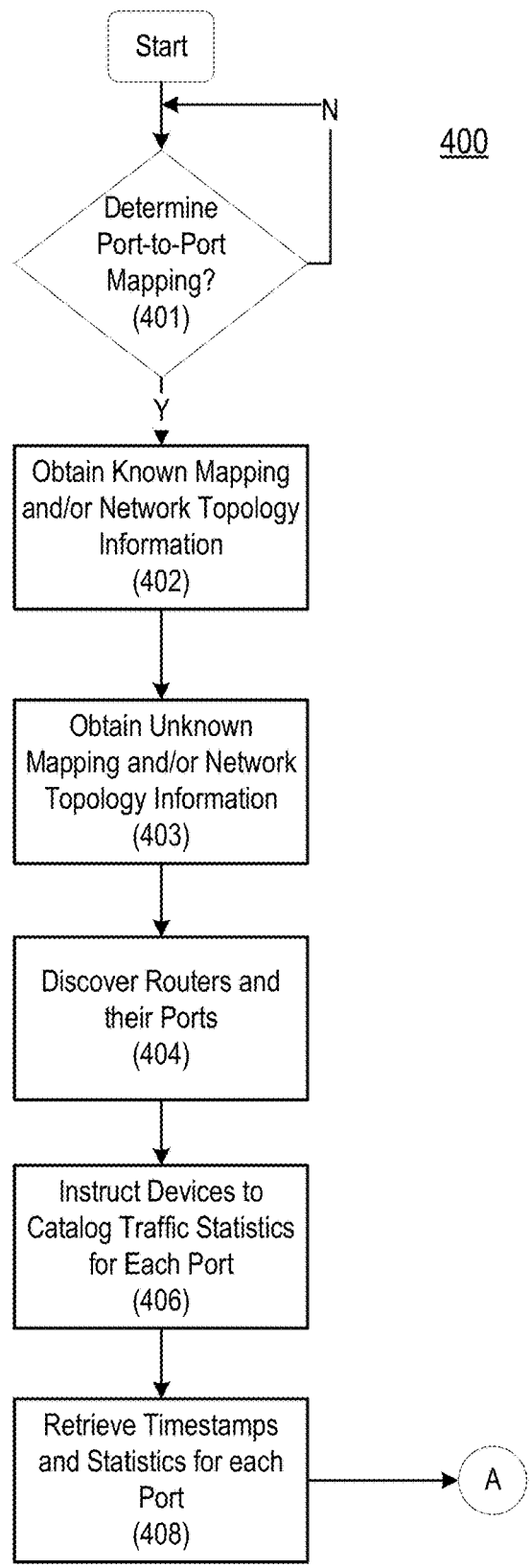
FIG. 4A shows an example flow diagram for monitoring and collecting port traffic statistics in the router and transport system.

FIG. 4A shows an example flow diagram for monitoring and collecting port traffic statistics in the router and transport system 300, which may be performed by a device 200 (e.g., the port server 150). At step 401, it is decided whether to determine a port-to-port mapping. For example, the device 200 may decide to determine a port-to-port mapping for ports having an unknown port-to-port mapping. As the method depicted in FIGS. 4A-4E may be performed periodically, there need not be a missing port-to-port mapping to determine whether to determine port-to-port mappings. The method shown in FIGS. 4A-4E may be performed to determine if any inaccuracies in port-to-port mappings may exist. The method shown in FIGS. 4A-4E may additionally and/or alternatively be performed in response to determining a potential inaccuracy in port-to-port mappings (e.g., a port-to-port mapping indicating that a single physical port is connected to multiple different devices simultaneously).

At step 402, the port server 150 may obtain known mapping and/or network topology information. For example, the port server 150 may retrieve the port-to-port mapping and topology information from a remote storage site. The topology information may indicate that the routers 152, 302 are logically connected to one another. For example, the port server 150 may send, to the NMS server 310, a request for any known mapping and topology information of the transport network 154 and, in response, the port server 150 may receive, from the NMS server 310, known port-to-port mapping and topology information of the transport network. Such mapping and/or network topology information may be as depicted in Table 2, below.

TABLE 2

| Device | Port No. |
| --- | --- |
| Transport Device 304 | Ethernet 1 |
| Transport Device 304 | Ethernet 2 |
| Transport Device 306 | Ethernet 3 |
| Transport Device 306 | Ethernet 4 |
| Transport Device 306 | Ethernet 1 |
| Transport Device 306 | Ethernet 2 |
| Transport Device 308 | Ethernet 1 |
| Transport Device 308 | Ethernet 2 |

At step 403, the port server 150 may obtain unknown mapping and/or network topology information. One or more ports having an unknown port-to-port mapping may be determined. A port-to-port mapping may be unknown if documentation of the mapping was lost, corrupted, or never created in the first place. The port-to-port mapping may be unknown if a technician changes a connection pertaining to the port and did not update documentation or documented erroneous information (e.g., entered the wrong port number, etc.). If mapping information for a port is missing from the mapping table, then that port's mapping may be considered unknown.

At step 404, the port server 150 may discover any other routers and any other ports of the transport system 300. Discovery of routers may be performed using, for example, an intermediate system to intermediate system (ISIS) protocol, interior gateway protocol (IGP), and/or using link layer discovery protocol (LLDP). In step 404, new routers may be discovered, in additional to previously known routers (e.g., those indicated by previous mapping and/or network topology information). During port discovery, port-to-port mappings may also be discovered by the port server 150. The discovery of ports may be performed by individually addressing each known router and requesting this information, which may be performed using ISIS, IGP, and/or LLDP. For example, the port server 150 may, using IGP, determine a list of routers, then, using the ISIS protocol, individually address each router to determine their ports and the ports directly or logically connected to those ports. As some routers (e.g., previously known routers as determined from known mapping and/or network topology information) may be disconnected, port information for all routers might not be determined.

At step 406, the port server 150 may instruct known devices to catalog traffic statistics for each port. The devices instructed may comprise devices indicated in known mapping and/or network topology information and/or any additional devices discovered in, e.g., step 404. Traffic statistics may comprise, for example, average total packet count for a port for various intervals and collected over a time period. The port server 150 may individually address each of the routers 152, 302 (and any discovered routers) and instruct each of these routers to monitor (e.g., collect) port traffic statistics over a configurable time period (e.g., 18 hours, 24 hours, 2 days, etc.). The configurable time period may comprise a start time and an end time and may comprise a length of time sufficient to uniquely distinguish traffic activity of different ports. For example, for a network with particularly low traffic, or for a network with consistently high traffic such that nearly all ports are always transmitting near capacity, the configurable time period may be longer in order to capture more unique traffic information about ports. In contrast, more moderately-trafficked networks may have more unique traffic signatures (e.g., a wider variety of high and low usage across different ports), meaning that relatively shorter configurable time periods may be used. The port server 150 may also instruct these routers to divide (e.g., segment) the monitored data at a configurable interval (e.g., every 5 minutes, 15 minutes, 30 minutes, 1 hours, 2 hours, etc.) and generate timestamps (e.g., in coordinated universal time (UTC)) for the interval. The timestamps may correspond to the configurable interval. The configurable time period and/or the configurable interval may be adjusted by the port server 150 e.g., based on user input from a technician. The instructions may specify to send the port characteristics and the results of the monitoring to the port server 150. In some examples, the instructions may be in the form simple network management protocol (SNMP) commands or an operation support system (OSS) protocol.

The instructions may instruct the device to identify various information about the device and the port along with the traffic statistics for the port. For example, the instructions may specify that the router identify the router and/or transport number ID, the port's ID number, the link type, the link direction (forward, reverse, or both), the fiber path for transport devices (e.g., end-to-end connectivity between transport devices), client source, client destination, wavelength information, and other port characteristics. The instructions may specify that ports having certain characteristics need not be monitored. If the device is capable of determining that a port is broken and/or disconnected, then the instructions may specify that traffic need not be monitored for that port. The instructions may specify that the interval with which traffic is monitored on a port may be modified based on the characteristics of the port, such that, for example, a longer interval may be used for a relatively slower (Category 5) Ethernet port, whereas a shorter interval may be used for a relatively faster (Category 6) Ethernet port.

The instructions may specify the traffic characteristic (e.g., performance metrics) to monitor and/or an interval by which to segment the monitored characteristics. For the routers 152, 302, the instructions may instruct each router, for each of its ports, to monitor the packet count over time and take an average packet count per a configurable sampling rate (e.g., 0.5 second, 1 second, 2 seconds, etc.) and store the data in segments according to the configurable interval (e.g., every 5 minutes, 15 minutes, 30 minutes, 1 hours, 2 hours, etc.). The configurable sampling rate may be adjusted by the port server 150 e.g., based on user input from a technician. For example, the configurable sampling rate may be 1 second and the configurable interval may be 5 minutes. The router may, for each port, determine and store an average packet count once per second, then collect in a segment the average packet counts for a time period (e.g., in a five minute period). The set of average packet counts per second may reflect the average packet count as a function of time, which may be used to generate a waveform as will be discussed below. While the above describes an example of total packet counts, the instructions may request the device to report a predetermined type of total packet count, such as packet counts for a particular direction of traffic (e.g., forward, reverse, bidirectional) and/or unicast/broadcast type, and any other desired category of packet. For example, the instructions may particularly request that the device report unicast packets in the forward direction (e.g., those sent out from the port).

For the transport devices 304-308, the instructions may be sent to the NMS server 310, which may, in turn, instruct the transport devices 304-308. The instructions may instruct each transport device, for each of its ports, to monitor the packet count (e.g., unicast, multicast, broadcast packets, inframes, outframes, etc.) over time and take an average packet count per a configurable sampling rate (e.g., 0.5 second, 1 second, 2 seconds, etc.) and store the data (e.g., in a segment) according to the configurable interval (e.g., every 5 minutes, 15 minutes, 30 minutes, 1 hours, 2 hours, etc.) in a similar manner as discussed above for the routers 152, 302. The NMS server 310 may ignore the configurable interval and instead use a different interval to, e.g., align the intervals from a plurality of different routers. For example, the configurable interval may be 5 minutes, and the different interval may be 15 minutes. The NMS server 310 may inform the port server 150 of the different interval. The port server 150 may align time intervals of monitored data from the routers 152, 302 and/or the transport devices 304-308, as discussed in detail below in FIG. 4C.

At step 408, the port server 150 may retrieve timestamps and statistics for each port of the transport system 300. Each of the routers 152, 302 and the transport devices 304-308 may monitor traffic information on each of their ports for the configurable time period and send the cataloged results of the monitoring and port characteristics to the port server 150. The port server 150 may send a request for the results to one or more of the routers 152, 302, the NMS server 310, and/or the transport devices 304-308 and, in response, may receive the monitoring results.

Figure 4B:
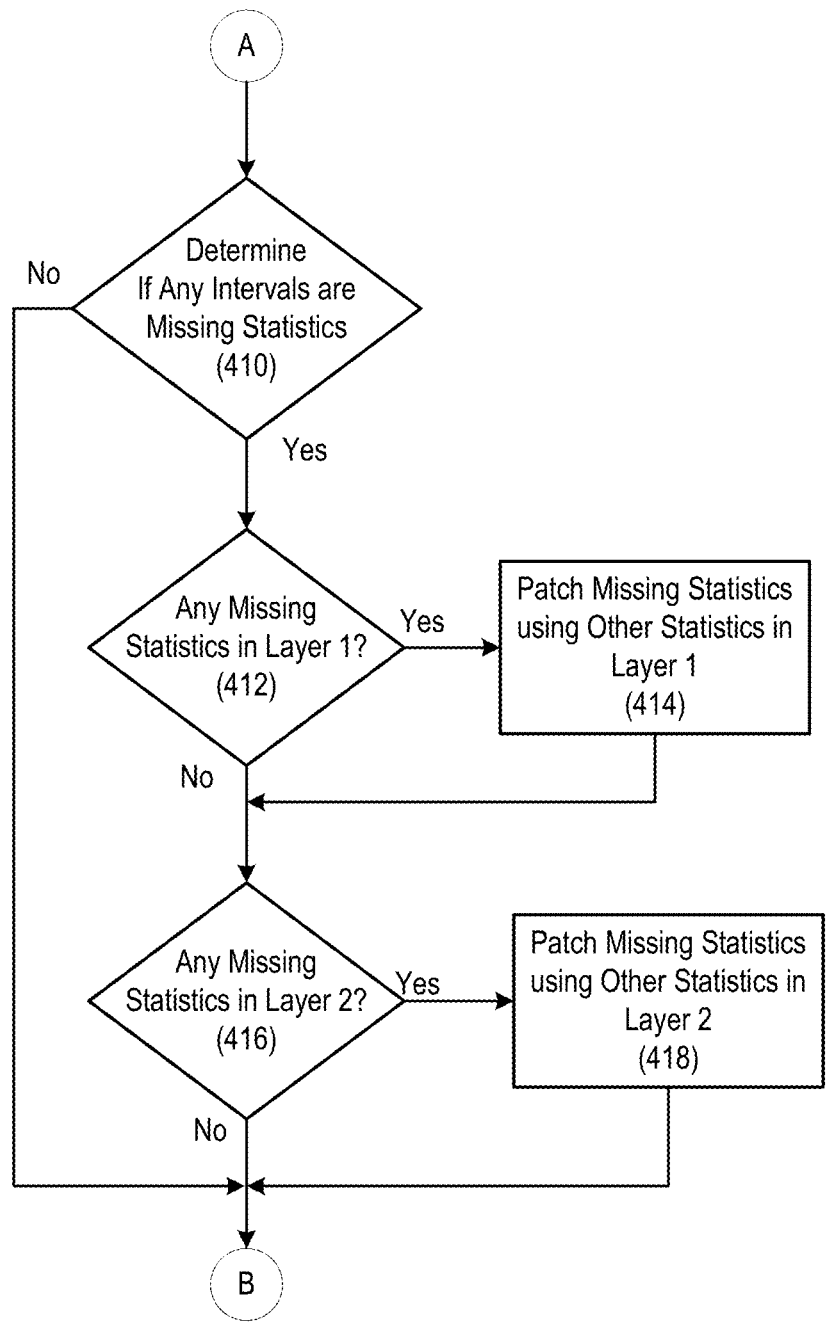
FIG. 4B shows an example flow diagram for patching missing data in the collected port traffic statistics.

After the port server receives the monitoring results in step 408, the port server 150 may proceed to perform the steps of FIG. 4B, which shows an example flow diagram for patching missing traffic statistics. At step 410, the port server 150 may determine whether there are missing statistics for any of the intervals. Such missing statistics may comprise a missing packet rate for a given time period, and/or a lack of reporting for a time period. For example, statistics may be missing if a period of time wherein a port was expected to have some traffic reports a null value or fails to report any traffic statistics at all. An example of such reported data, limited to the average packet count over one hour divided into 15-minute segments and featuring such a deficiency, is provided below as Table 3.

TABLE 3

| Segment No. | Time Period | Average Packet Count at Port 1 |
| --- | --- | --- |
| 1 | 0:00-0:15 | 305 |
| 2 | 0:15-0:30 | 0 |
| 3 | 0:30-0:45 | 309 |
| 4 | 0:45-1:00 | 315 |

The port server 150 may analyze received traffic statistics to determine whether expected traffic statistics are missing. The port server 150 may determine that traffic statistics are missing by evaluating received traffic statistics and determining that no traffic is reported for a period of time wherein traffic was expected. For example, in Table 3, it is likely that segment 2 is missing, particularly because segments 1 and 3 reflect traffic, meaning that it may be likely that traffic occurred during the period of 0:15-0:30. The port server 150 may additionally and/or alternatively determine that traffic statistics are missing by analyzing timestamps corresponding to traffic statistics to determine if they are different from expected timestamps. Because timestamps may vary due to expected delays in processing and transmission, timestamps need not exactly match, and the port server 150 might determine that a segment is missing if no timestamps correspond, within a threshold, to a period of time. For example, returning to Table 3, if the port server 150 expected to receive statistics for the period of 0:15-0:30 but received no such traffic statistics within a threshold range of that time period, the port server 150 may determine that traffic statistics for that period are missing. Additionally and/or alternatively, the port server 150 may determine that a segment is missing by determining that a received number of segments is under a certain number of expected segments. The port server 150 may inspect each segment and, if the segment comprises a null value, determine that traffic statistics are missing.

For a given port, there may be missing traffic statistics for an interval if there was an error in the monitoring and/or collecting of the statistics. There might not be missing statistical data if a packet or frame was dropped during transmission of a signal through the port, as long as the device obtained traffic statistics for the port.

Figure 4C:
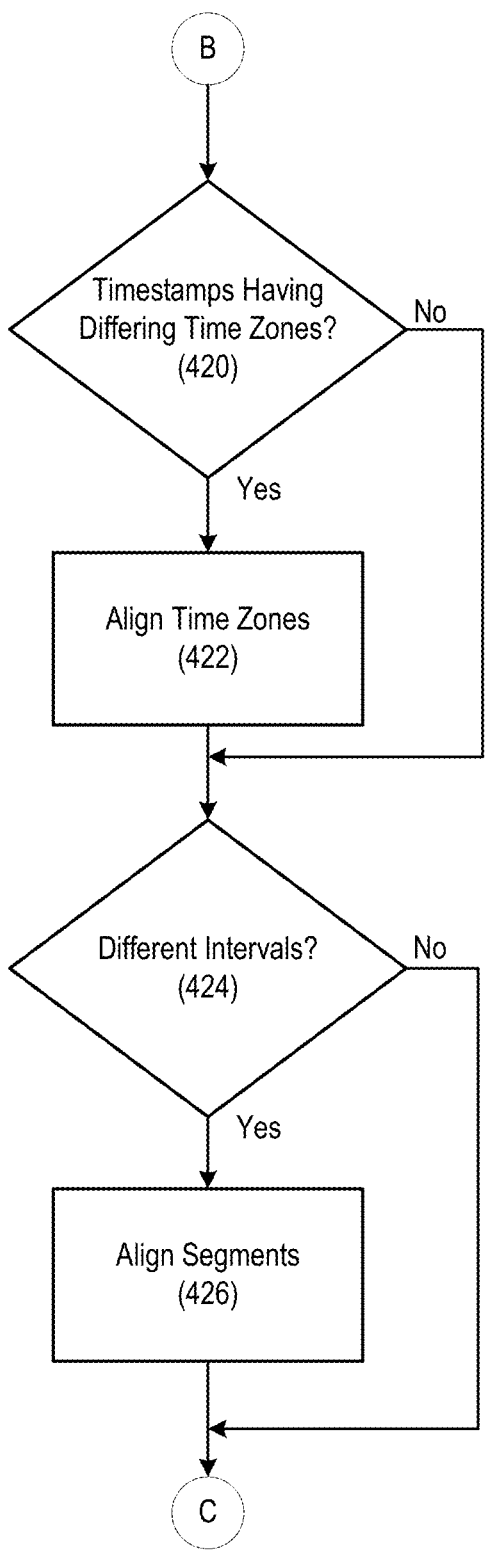
FIG. 4C shows an example flow diagram for aligning time frames of the collected port traffic statistics.

If there are not any missing statistics for any of the ports, the process may proceed to the steps of FIG. 4C. Otherwise, if there are missing statistics for any of the ports, the port server 150 may, at step 412, determine whether the missing statistics occurred in a device in a given layer of the Open Systems Interconnection (OSI) model. Devices in a same layer may be expected to have the same signals transmitted to each of them. As an example, the routers 152, 302 may be in a first layer (e.g., layer 3 in network layering) and the transport devices 304-308 may be in a second layer (e.g., layer 1 in network layering). Additionally, at least some of the port-to-port mappings of devices in the same layer may be known. For example, the logical port-to-port mapping between ports of the routers 152, 302 may be known and the direct port-to-port mapping between ports of the transport devices 304-308 may also be known.

If there are not any missing statistics in the first layer (e.g., layer 3), the port server 150 may proceed to step 416. Otherwise, if there are missing statistics in the first layer, the port server 150 may, at step 414, patch missing statistics using other statistics in the first layer. Patching missing statistics may comprise associating traffic statistics from a first port to a second port, such as where the two ports are connected. Because a signal transmitted from a first port along a link to a second port may be the same at both ports, the port server 150 may use the logical or direct port-to-port mappings and the traffic statistics of the second port to patch missing traffic statistics for the first port, or vice-versa. For example, the signal transmitted on port 3 of the router 152 to port 3 of the router 302 via the transport network 154 may be the same. As a result, if the missing statistics for a particular interval is missing on port 3 of the router 152, the port server 150 may look at the same corresponding interval for port 3 of the router 302, using the timestamp associated with the interval. Thus, the port server 150 may determine the traffic statistics for port 3 of the router 302 for the corresponding interval and may use those traffic statistics as the traffic statistics for port 3 of the router 152 for the corresponding interval.

At step 416, the port server 150 may determine whether there are any missing statistics in a second layer (e.g., layer 1). If there are no missing statistics in the second layer, the process may continue for any other layers and then proceed to the steps of FIG. 4C. Otherwise, if there is missing statistics in the second layer, the port server 150 may, at step 418, patch missing statistics using other statistics in the second layer.

Because a signal transmitted from a first port along a link to a second port may be the same at both ports, the port server 150 may use the port-to-port mapping and the results of first port to patch missing statistical data on the second port, and vice-versa.

Additionally, because the transport device 304 and the transport device 308 are in the same layer, the port server 150 may patch statistics for a particular interval and associated with a port of the transport device 304 with statistics for the particular interval and associated with a port of the transport device 308 even though there might not be a direct port-to-port connection since there may be a logical mapping between the ports. For example, if statistics are missing for a particular interval and for port 1 of the transport device 304, the port server 150 may determine the statistics for the particular interval and for port 1 of the transport device 308 and use those statistics as the traffic statistics for port 1 of the transport device 304 for the particular interval (e.g., by replacing a null value or adding a missing segment). The process may continue in similar manner for any other layers and then proceed to the steps of FIG. 4C.

Figure 4D:
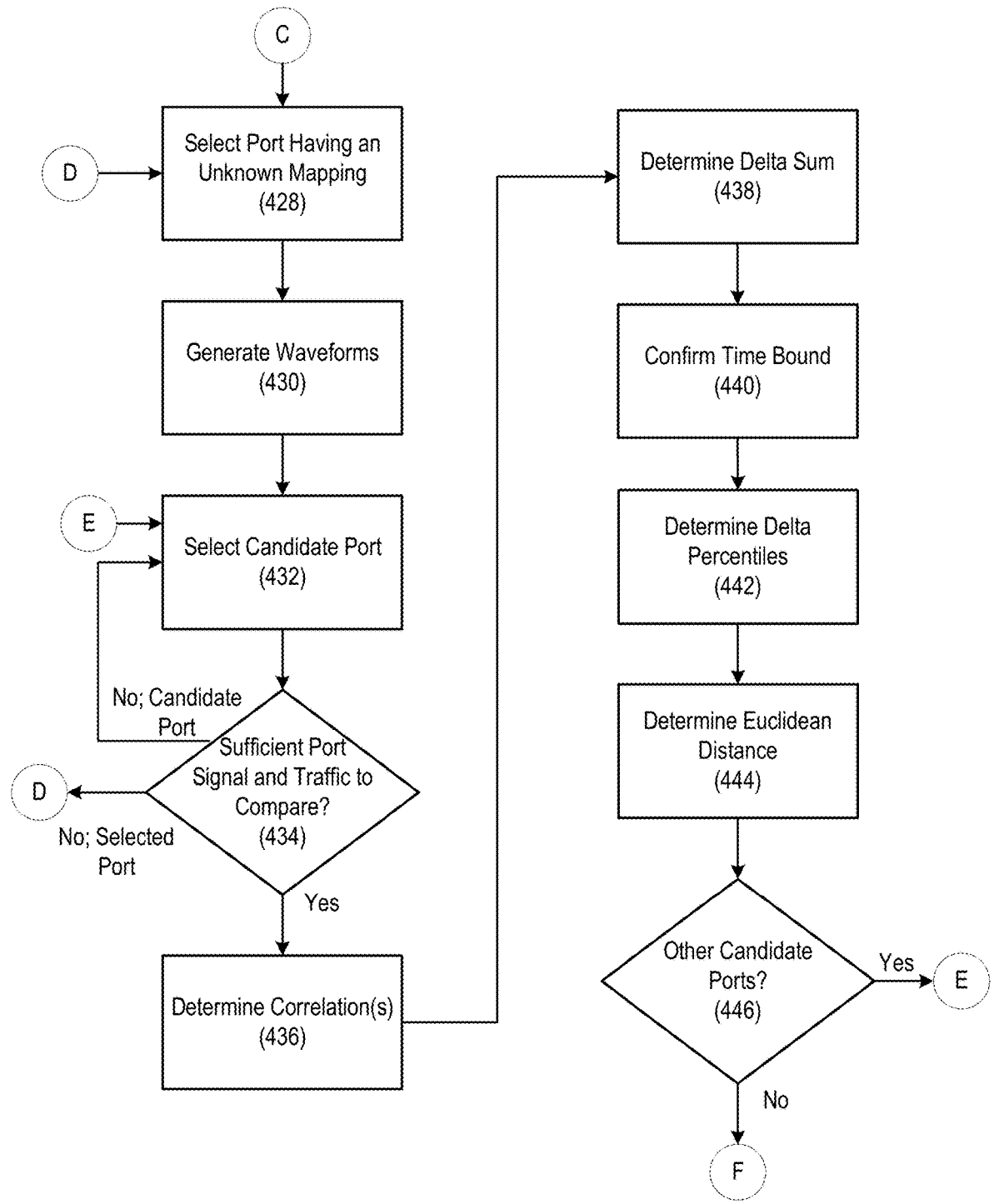
FIG. 4D shows an example flow diagram for analyzing the collected port traffic statistics.

FIG. 4C shows an example flow diagram for aligning time frames of the collected port traffic statistics so that the port traffic statistics for the same time frames may be compared as will be discussed in FIG. 4D below. At step 420, the port server 150 may determine whether timestamps of the devices have different time zones. For example, the router 152 may be located in Boston and its timestamp may be in an Eastern Standard Time (EST) and the router 302 may be located in San Francisco and its timestamp may be in Pacific Standard Time (PST). As a result, the timestamps might be misaligned due to the differences in time zones.

If the timestamps are not associated with different time zones (e.g., each of the timestamps on each of the ports is associated with the same time zone or is in UTC), the process may proceed to step 424. Otherwise, if the timestamps are associated with different time zones, the port server 150 may, at step 422, align the time zones by adjusting the timestamps such that they all correspond to the same time zone. The port server 150 may adjust each of the timestamps to the UTC, the EST time zone, or any other time zone.

At step 424, the port server 150 may determine whether different intervals were used in monitoring and cataloging the port traffic statistics. The port server 150 may have stored an indication of which interval instruction was sent to the routers 152, 302. For example, the port server 150 may have instructed the router 152 to use a 5 min interval. The NMS server 310 may inform the port server 150 of the interval it used for the transport devices 304-308. The port server 150 may determine the interval for the transport devices 304-308 by inspecting the timestamps of the segments of traffic statistics for ports of the transport devices 304-308. For example, for a given port, a timestamp of a first interval (or segment) may be 10:00 am and a timestamp of a second interval (or segment) may be 10:15 am. Because the temporal difference is 15 minutes, the port server 150 may determine that the interval used for the given port is 15 minutes. The port server 150 may make similar calculations for other ports to determine their corresponding intervals.

After the interval used for monitoring each of the ports is determined, the port server 150 may compare them to determine whether they are different from one another. If there are no differences, the process may proceed to FIG. 4D. Otherwise, if there are differences in the intervals, the port server 150 may, at step 426, align segments associated with different ports so that the port server 150 may later compare corresponding segments associated with different ports against one another. For example, the routers 152, 302 may have used an interval of 5 minutes in collecting traffic data at each of their ports and the transport devices 304-308 may have used an interval of 15 minutes in collecting traffic data at each of their ports. As a result, the port server 150 may wish to group three consecutive 5 min segments into a group so that the traffic statistics of the group may be compared with the traffic statistics of a corresponding 15 minute segment.

FIG. 5 shows an example table grouping, based on timestamps, of three 5-minute segments of traffic statistics associated with port 3 of the router 152 with a 15 minute segment of traffic statistics associated with port 3 of the transport device 304. As shown in FIG. 5, by grouping the segments associated with timestamps 12:05, 12:10, and 12:15 for port 3 of the router 152, the group now may now have the same time bounds (e.g., a start time of 12:00 and an end time of 12:15) as that of the segments associated with timestamp 12:15 for port 3 of the transport device 304.

Grouping segments might not result in an exact matching of the time bounds of the grouping for one port with the segment of another port. For example, if the timestamp 12:15 for port 3 of the router 152 was instead 12:16, then the end time of the time bound of the group would not match that of the segment associated with timestamp 12:15 of port 3 of the transport device 304. In such examples, the port server 150 may still consider this a match if the time bounds (e.g., difference in end times or timestamps between the grouping of segment for one port and the comparative segment of the other port) are less than a configurable preset threshold (e.g., 30 seconds, 1 minute, 2 minutes, etc.). Otherwise, the segment may be grouped in a different grouping (e.g., the next grouping). Similar techniques may be used with respect to the start time of the time bounds.

In order to confirm that one segment has not been grouped incorrectly due to misalignment, the port server 150 may determine an expected number of segments per group. For example, based on determining that 15 minute groups of traffic statistics have been separated into five-minute segments, the port server 150 may determine that there should be three segments in each group, such that a group with four or two segments may indicate that a segment has been grouped incorrectly due to misalignment. If the port server 150 determines that a grouping has less than the number of segments for each group (e.g., that a group only has two segments) and/or if the port server 150 determines that a grouping has more than the number of segments for each group (e.g., that a group has four segments), the port server 150 may output a visual table (e.g., FIG. 5) showing the groupings of segments of some ports versus segments of other ports. A technician may then visually inspect the grouping and may move segments from one grouping to another to make each group have the correct number of segments.

The transport system 300 may comprise multiple NMS servers. Each NMS server may use a different interval. By performing the steps of FIG. 4C, the port server 150 may also group segments of various ports to align with segments formed using different intervals.

To minimize temporal misalignment and the number of groupings of segments, the port server 150 may, prior to transmitting the monitoring instructions, transmit, to the NMS server 310 (and other NMS servers), an indication of an interval which may be used by the transport devices 304-308 to segment the port traffic data. The port server 150 may also receive one or more interval indications from the NMS servers. The port server 150 and the NMS servers may thereby exchange intervals, and such an interval exchange may allow the port server 150 to determine whether any potential interval alignment issues may exist. Should a potential interval alignment issue exist (e.g., the two intervals do not match, such that traffic statistics may be hard to compare across different transport devices, the port server 150 may determine and transmit an interval for devices to use to reduce the alignment issues and number of groupings. For example, based on determining that two transport devices have very different intervals (e.g., three minutes and seven minutes), the port server 150 may cause both transport devices to use one minute intervals instead. The port server 150 may select the least common denominator as the interval. For example, if the NMS server 310 indicates a 15 minute interval and the port server 150 is configured to use a 5 minute interval, then the port server 150 may instruct routers 152, 302 to use a 15 minute interval (instead of a 5 minute interval).

If a data segment is missing or a null value and could not be patched (discussed above in FIG. 4B), then the segment may be grouped and/or otherwise aligned with other segments.

After the segments have been aligned, the port server 150 may compare segments from different ports associated with the same time period to determine whether two ports exhibited the same traffic signature during the same time period. FIG. 4D shows an example flow diagram for performing analyzing of the collected traffic statistics. At step 428, the port server 150 may select a port having an unknown mapping. As discussed above in connection with FIG. 3, the port-to-port mapping for ports 3 and 4 of the router 152, ports 3 and 4 of the router 302, ports 3 and 4 of the transport device 304, and ports 3 and 4 of the transport device 308 may be unknown. As an example, the port server 150 may select port 3 of the router 152. The port server 150 may select a port with a known port-to-port mapping to confirm that the port-to-port mapping is correct.

Figure 6:
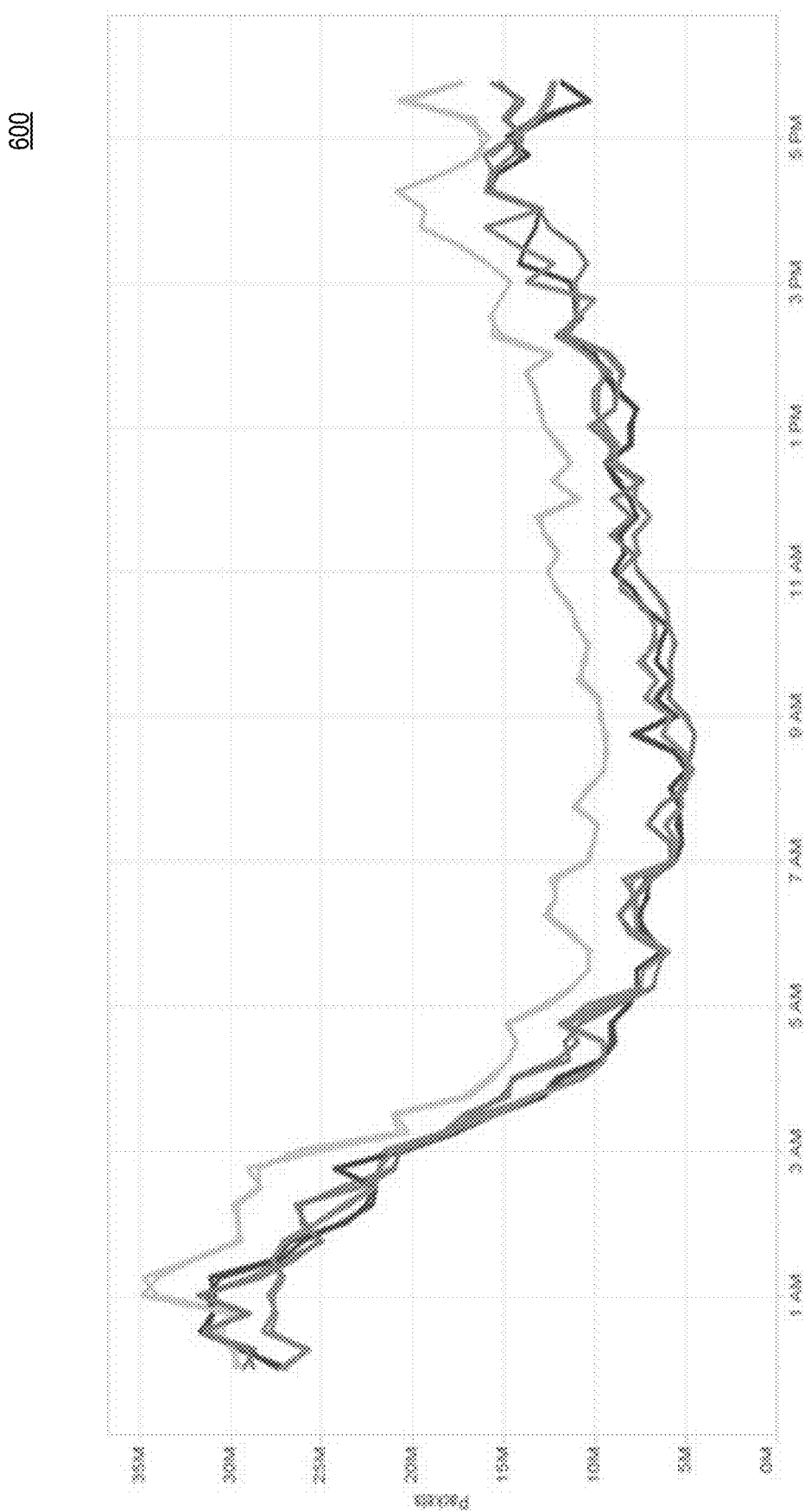
FIG. 6 shows an example graph of waveforms for a selected port and various other ports in the system.

At step 430, the port server 150 may generate waveforms for each port. A waveform for a particular port may be generated based on the port's traffic statistics collected in the segments and/or groups over the configurable time period. The waveform may be plotted as function of packet count and time. FIG. 6 shows an example graph of waveforms for a selected port and various other ports in the transport system 300 as function of average packet count and time. The port server 150 may cause display of the waveforms to a technician. The more closely that a waveform matches or has the same shape as the waveform for the selected port, the more likely that the waveform is associated with a port that is connected to the selected port. As a result, the technician may be able to visually estimate whether a first waveform of a first port and a second waveform of a second port are sufficiently similar such that the two ports may be connected.

Returning to FIG. 4D, at step 432, the port server 150 may select a candidate port, which may be any port in the transport system 300 other than the selected port. A candidate port may be any port that may be possibly connected via a direct link or logical connection to the selected port. The port server 150 might not consider ports with a known direct port-to-port mapping to be a candidate port. The port server 150 may consider ports with a known direct port-to-port mapping to be a candidate port to account for possible errors in port-to-port mapping. The port server 150 might not consider a port that is part of the same device as the selected port to be a candidate port.

At step 434, the port server 150 may determine whether the selected port's traffic and the candidate port's signal and traffic are sufficient to perform comparisons. For example, the port server 150 may determine a traffic sum over the configurable time period (e.g., 24 hours) for each of the selected port and the candidate port. A traffic sum for a port may be the number of packets that traveled through the port over the time period, which may be calculated by aggregating the average packet count of each segment for the port over the time period. The port server 150 may then compare each of the traffic sums (e.g., the traffic sum for the selected port and the traffic sum for the candidate port) with a configurable minimum traffic threshold. The configurable minimum traffic threshold may be adjusted by the technician using the port server 150. The minimum threshold may be considered the minimum amount of traffic to perform a comparison. For example, the minimum traffic threshold may be 1,000,000 packets over the time period.

If each of the selected port's traffic sum over the time period and the candidate port's traffic sum over the time period satisfies (e.g., is greater than or equal to) the minimum traffic threshold, the port server 150 may determine that there is sufficient traffic to perform comparisons between the selected port and the candidate port and, as a result, may proceed to step 436, unless there is insufficient signal.

As the port server 150 determines various metrics in FIGS. 4A-4E, the port server 150 may record the results in its memory. The results may be organized in the form of a table 700 as shown in FIG. 7. The table 700 may comprise a column for recording the results of whether a port satisfied the minimum traffic threshold. A "1" may represent satisfying the minimum traffic threshold and a "0" may represent not satisfying the minimum traffic threshold.

Returning to FIG. 4D, if the candidate port's traffic sum over the time period does not satisfy (e.g., is less than) the minimum traffic threshold, there might not be sufficient traffic to perform a comparison and the port server 150 may discard the candidate port and return to step 432 to select a new candidate port. The port server 150 may, rather than select a new candidate port, determine to continue analysis and comparison for the candidate port despite having insufficient traffic and proceed to step 436.

If the selected port's traffic sum over the time period does not satisfy the minimum traffic threshold, there might not be sufficient traffic to perform a comparison and the port server 150 may discard the selected port and return to step 428 to select a new port having an unknown port-to-port mapping. In some cases, the port server 150 may, rather than select a new port having an unknown port-to-port mapping, determine to continue analysis and comparison for the selected port despite having insufficient traffic, and proceed to step 436.

The port server 150 may also determine if there is sufficient signal overlap between the selected port's traffic and the candidate port's traffic over the time period for comparison. The port server 150 may determine overlapping segments. For example, the port server 150 may determine the number of segments with a non-null value for the selected port that have a corresponding segment with a non-null value for the candidate port. As another example, the selected port may have 95 segments that have a non-null value and the candidate port may have 85 segments that have a non-null value; however, the number of overlapping segments may be 80 segments since some of the segments with non-null values might not overlap. The number of overlapping segments may be compared with a configurable minimum number of overlapping segments. The configurable minimum number of overlapping segments may be adjusted by the technician using the port server 150. For example, the minimum number of overlapping segments may be 50 segments over the time period. If the number of overlapping segments satisfies (e.g., is greater than or equal to) the minimum number of overlapping segments, the process may continue to step 436. Otherwise, if the number of overlapping segments fails to satisfy (e.g., is less than) the minimum number of overlapping segments, the process may return to step 432.

The port server 150 may determine whether there is sufficient overlapping signal to perform a comparison based on a percentage of overlapping segments relative to the number of segments with a non-null value of the selected port (or the candidate port). As an example, if the number of segments having non-null values for the selected port is 72 and the number of overlapping segments is 63, then the percentage of overlapping segments may be 63 divided by 72, which is equal to 87.5%. The percentage of overlapping segments may be compared with a configurable minimum percentage of overlapping segments. The configurable minimum percentage of overlapping segments may be adjusted by the technician using the port server 150. For example, the minimum percentage of overlapping segments may be 75%. If the percentage of overlapping segments satisfies (e.g., is greater than or equal to) the minimum percentage of overlapping segments, the process may continue to step 436. Otherwise, if the percentage of overlapping segments fails to satisfy (e.g., is less than) the minimum percentage of overlapping segments, the process may return to step 432.

In some examples, there may be 10% overlap, but there might not be enough traffic statistics associated with the segments and/or grouping of segments to make accurate comparisons. Thus, the port server 150 may determine, for each port, the number of segments and/or grouping of segments that have sufficient traffic statistics. The port server 150 may determine the number of traffic statistics (e.g., number of average packet counts) in a segment or grouping of segments and compare that number with a minimum traffic statistics threshold. If the number is greater than the minimum traffic statistics threshold, then the port server 150 may count that segments and/or grouping. Otherwise, that segment and/or grouping might not be counted. The port server 150 may, for a port, determine a total number segments and/or groupings that have satisfied the minimum traffic threshold and compare that total number with a configurable minimum total number of segments threshold. If the total number satisfies (e.g., is greater than or equal to) the total number of segments threshold, the process may continue. Otherwise, the port server 150 may determine that is insufficient data and select another port.

At step 436, the port server 150 may determine one or more correlations between the traffic statistics of the selected port and the traffic statistics of the candidate port. The port server 150 may determine a Pearson correlation between the traffic statistics of the selected port and the traffic statistics of the candidate port. For example, the Pearson correlation may be based on the segments of the selected port and the segments of the candidate port. The port server 150 may also determine the "p" value for the Pearson correlation, which represents the degree to which two values change correspondingly. A correlation may be based on a similarity of a shape of the waveforms between the selected port and the candidate port.

At step 438, the port server 150 may determine the delta sum between the traffic sums of the selected port and the candidate port, which may be used to determine a delta sum ranking of the candidate port as will be discussed in further detail at step 450. As discussed above at step 434, the port server 150 may have already determined the traffic sum over the configurable time period (e.g., 24 hours) for each of the selected port and the candidate port. A traffic sum for a port may be the number of packets that traveled through the port over the time period, which may be calculated by aggregating the average packet count of each segment for the port over the time period. Using the selected port as the underlying baseline, the delta sum may be determined by the following formula:

$$\text{Delta Sum} = \frac{SP's \text{ Traffic Sum} - CP's \text{ Traffic Sum}}{SP's \text{ Traffic Sum}}$$

The selected port may be referred to as "SP" and the candidate port may be referred to as "CP" in the above formula to determine the delta sum.

At step 440, the port server 150 may wish to confirm the time period so that the corresponding segments for the selected port and the candidate port are used in the comparisons. The port server 150 may determine a difference in median timestamp values between the segments for the selected port and the segments for the candidate port to confirm that the segments for the selected port and the candidate port are for the same configurable time period (e.g., 24 hours). For example, the port server 150 may determine the median of the timestamp values of the segments for the selected port and the median of the timestamp values of the segments for the candidate port. The port server 150 may determine the absolute difference between these two values. The closer the absolute difference of these two values is closer to zero, the more likely that the segments for the selected port and the segments for the candidate port are based on the same time period.

At step 442, the port server may wish to determine delta percentiles, which will be used to perform a non-linear comparison between segments or groupings of the selected port and segments or groupings of the candidate port. For the selected port, the port server 150 may reorder packet data by traffic volume rather than by time to provide a non-linear basis of comparison. Each of the segments or groupings for the selected port may comprise the average total packet count per second over an interval (or multiple intervals for grouping), which results in a large number of values for the average total packet count. The port server 150 may rank the values for average total packet count from highest to lowest thereby making the ranking independent of its timestamp and, hence, non-linear. Using the ranking (e.g., reordering) and the total number of values for the average total packet count, the port server 150 may determine, for the selected port, a percentile rank for each ranking of the values of the total packet count. Similarly, the port server 150 may, for a candidate port, determine its total number of values for average packet count, rank the values from highest to lowest, and determine a percentile rank for each ranking of the values of the total packet count.

The port server 150 may compare the average total packet counts for the selected port and candidate port having the same percentile rank to generate a delta percentile. The comparison may be limited to a subset of the percentile ranks, which may be specified by the technician at the port server 150. The comparison for a particular percentile rank may be performed using the following formula:

$$\text{Delta Percentile} = \frac{SP's \text{ APC for } P(x) = CP's \text{ APC for } P(x)}{SP's \text{ APC for } P(x)}$$

In the above formula, "SP" may refer to the selected port, "CP" may refer to the candidate port, "APC" may refer to the average packet count, and "P(x)" may refer to percentile rank. In one example, the selected port and the candidate port may, for the $20^{th}$ percentile rank, have an average packet count of 200 and 150, respectively. Using the formula, the percentile difference may be (200−150)/200, which equals 0.25.

At step 444, the port server 150 may determine a Euclidean distance that accounts for a total window volume and a wide sampling of non-linear data, which may be later used to rank the candidate ports in step 452. The total window volume may be represented by the delta sum, which has been discussed above. The sampling of the non-linear data may be the percentile differences for multiple percentile ranks, which has also been discussed above. The port server 150 may select a configurable number of percentile differences in determining the Euclidean Distance, which may be specified by a technician of the port server 150. The port server 150 may determine a Euclidean distance using the following formula:

$$\text{Distance} = \sqrt{\text{Delta } Sum^2 + \text{First Delta } Percentile^2 + \ldots + Nth \text{ Delta } Percentile^2}$$

The port server 150 may select the delta percentiles associated with three percentiles: a high percentile (e.g., the $75^{th}$ percentile), a medium percentile (e.g., the $50^{th}$ percentile), and a low percentile (e.g., the $25^{th}$ percentile). The Euclidean distance may be the square root of the sum of the delta $sum^2$, the delta percentile for the $75^{th}$ $percentile^2$, the delta percentile for the $50^{th}$ $percentile^2$, and the delta percentile for the $25^{th}$ $percentile^2$.

At step 446, the port server 150 may determine whether there are any other candidate ports that have not yet been analyzed with respect to steps 434-444. If so, the process may return to step 432 and the port server 150 may repeat steps 434-444 with respect to another candidate port. By repeating steps 432-446, the port server 150 may analyze and compare the selected port's traffic statistics with each candidate port's traffic statistics. If each of the candidate ports have been analyzed, the process may continue to step 448 of FIG. 4E.

Figure 4E:
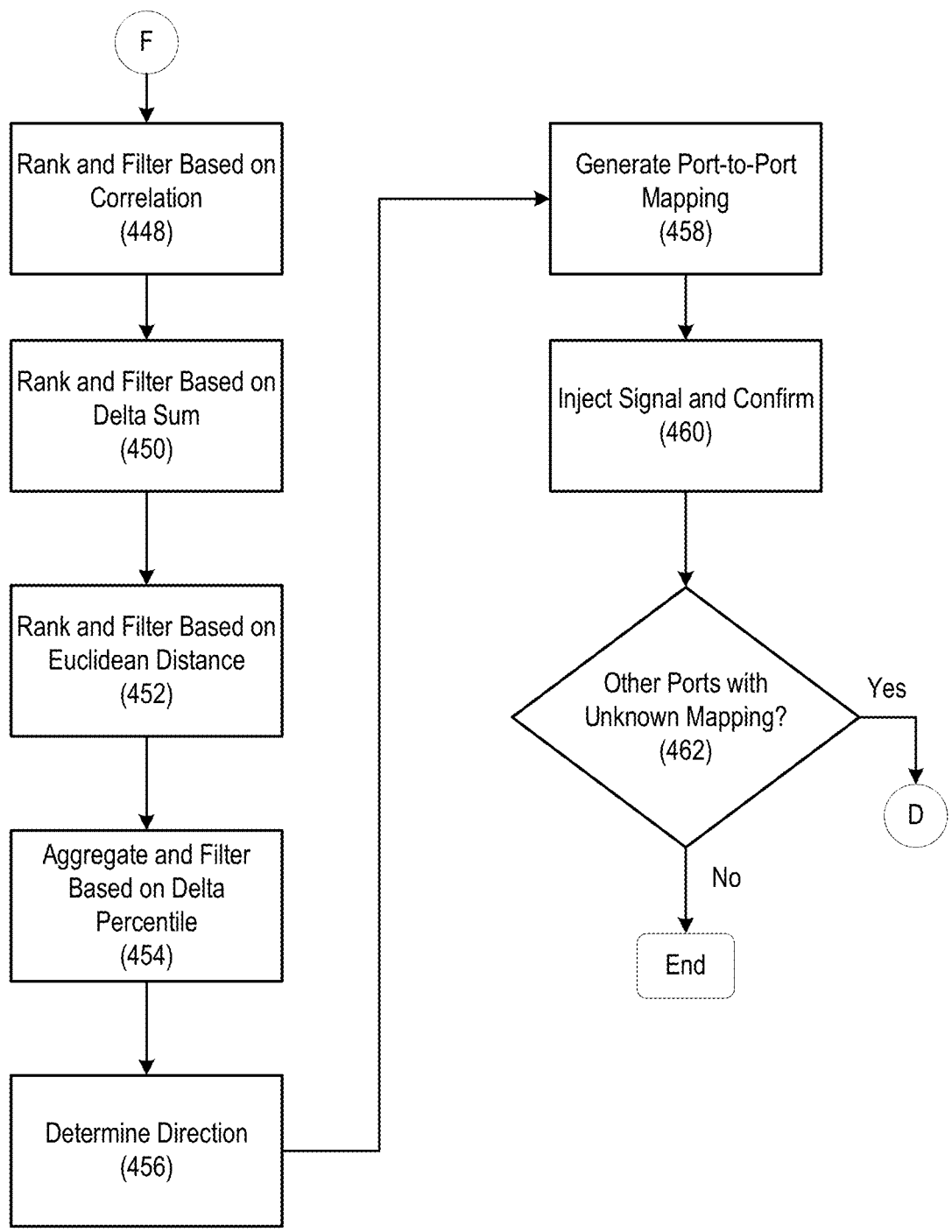
FIG. 4E shows an example flow diagram for performing a correlative association between ports in the router and transport system.

FIG. 4E shows an example flow diagram for performing a correlative association between ports in the router and transport system 300. At step 448, the port server 150 may rank and filter candidate ports based on determined correlation data. Previously, by repeating step 436 for the selected port and each of the candidate ports, the port server 150 determined a correlation between the traffic statistics of the selected port and the traffic statistics of each of the candidate ports. The port server 150 may aggregate and rank the analyzed traffic statistics of the candidate ports by correlation from most to least similarity (e.g., highest to lowest). The table 700 in FIG. 7 shows an example ranking by correlations with 0.999 being the highest value and 0.963 being the lowest value. The port server 150 may select a configurable n-best list of the ranked correlations. For example, the port server 150 may select analyzed traffic statistics associated with candidate ports having the three highest correlations. As another example, in table 700, the port server 150 may select the analyzed traffic statistics for ports 3 and 4 of transport device 304 and port 3 of router 302. The remainder of lower correlated analyzed traffic statistics may be filtered and/or otherwise removed from consideration as a candidate port for port-to-port mapping with the selected port, unless its traffic statistic are selected for another reason (e.g., selected based on a delta sum ranking, or Euclidean distance ranking discussed below). The port statistics may be ranked by other correlation data and filtered similarly. The number to select for the n-best lists described herein may be configured by a technician using the port server 150. In some examples, the number for the n-best list may be 1, 2, 3, or any other number.

At step 450, the port server 150 may rank and filter candidate ports based on delta sum. Previously, by repeating step 438 for the selected port and each of the candidate ports, the port server 150 determined a delta sum between the traffic statistics of the selected port and the traffic statistics of each of the candidate ports. The port server 150 may aggregate and rank the analyzed traffic statistics of the candidate ports by delta sum from most to least similarity (e.g., lowest to highest). The port server 150 may select a configurable n-best list of the ranked delta sums. For example, the port server 150 may select analyzed traffic statistics associated with candidate ports having the three lowest delta sums. The remainder of analyzed traffic statistics having higher delta sums may be filtered and/or otherwise removed from consideration as a candidate port for port-to-port mapping with the selected port, unless its traffic statistics are selected for another reason (e.g., selected based on correlation ranking, or Euclidean distance ranking discussed herein). The number to select for the n-best lists described herein may be configured by a technician using the port server 150. In some examples, the number for the n-best list may be 1, 2, 3, or any other number.

At step 452, the port server 150 may rank and filter candidate ports based on Euclidean distance. Previously, by repeating step 444 for the selected port and each of the candidate ports, the port server 150 determined a Euclidean distance between the traffic statistics of the selected port and the traffic statistics of each of the candidate ports. The port server 150 may aggregate and rank the analyzed traffic statistics of the candidate ports by Euclidean distance from most to least similarity (e.g., lowest to highest distance). The port server 150 may select a configurable n-best list of the ranked Euclidean distances. For example, the port server 150 may select analyzed traffic statistics associated with candidate ports having the three lowest Euclidean distances. The remainder of analyzed traffic statistics having higher Euclidean distances may be filtered and/or otherwise removed from consideration as a candidate port for port-to-port mapping with the selected port, unless its traffic statistics are selected for another reason (e.g., based on correlation ranking, or delta sum ranking discussed herein). The number to select for the n-best lists described herein may be configured via the port server 150.

At step 454, the port server 150 may aggregate the n-best lists into an overall table and filter candidate port based on delta percentile. The aggregated n-best may comprise the selected ports that were selected based on at least one of correlation ranking, delta sum ranking, or Euclidean distance ranking. As discussed above in step 442, for each candidate port and for each percentile, the port server 150 determined a delta percentile with respect to the selected port. For example, a $90^{th}$ percentile for port 3 (e.g., a candidate port) of the transport device 304 may have an average packet count of 96 packets and the $90^{th}$ percentile for selected port may have an average packet count of 100, and the delta percentile may equal (100 minus 96) divided by 100, which equals 4%. As another example, a $50^{th}$ percentile for port 3 (e.g., a candidate port) of the transport device 304 may have an average packet count of 94 packets and the $50^{th}$ percentile for selected port may have an average packet count of 103. In such an example, the delta percentile may equal (103 minus 94) divided by 103, which equals 8.7%.

The port server 150 may count, for a given candidate port, how many of the determined delta percentiles are less than a configurable maximum delta percentile threshold (e.g., 5%). For example, a candidate port on the aggregated n-best list may have the following 11 delta percentiles:

| Percentile | Delta Percentile |
|---|---|
| $10^{th}$ Percentile | 1% |
| $20^{th}$ Percentile | 5% |
| $25^{th}$ Percentile | 7% |
| $30^{th}$ Percentile | 4% |
| $40^{th}$ Percentile | 2% |
| $50^{th}$ Percentile | 2% |
| $60^{th}$ Percentile | 2% |
| $70^{th}$ Percentile | 6% |
| $75^{th}$ Percentile | 1% |
| $80^{th}$ Percentile | 4% |
| $90^{th}$ Percentile | 5% |

If the configurable maximum delta percentile threshold is 5%, then there may be 9 delta percentiles that satisfy (e.g., are less than or equal to) the 5% maximum delta percentile threshold and 2 delta percentiles might not satisfy (e.g., are greater than) the 5% maximum delta percentile threshold.

The port server 150 may compare, for the candidate port, the number of delta percentiles that satisfy (e.g., are less than or equal to) the maximum delta percentile threshold (e.g., the 5% maximum delta percentile threshold) with a configurable minimum number threshold (e.g., 7, 8). For the candidate port, if the number of delta percentiles that satisfy the maximum delta threshold satisfy (e.g., is greater than or equal to) the minimum number threshold, the candidate port might not be removed from consideration as a candidate port and, thus, its analyzed traffic statistics may be maintained at (e.g., not removed from) the aggregated n-best list. Otherwise, if the number of delta percentiles that satisfy the maximum delta threshold does not satisfy (e.g., is less than) the minimum number threshold, the candidate port may be filtered and/or otherwise removed from consideration as a candidate port and, thus, its analyzed traffic statistics may be removed from the aggregated n-best list.

Following the above example, if the configurable minimum number threshold is 7, because there are 9 delta percentiles that satisfy (e.g., are less than or equal to) the 5% maximum delta percentile threshold and that number (e.g., 9) is greater than or equal to 7, the candidate port may remain in consideration as a candidate port and its analyzed traffic statistics might not be removed from the aggregated n-best list. As another example, if the configurable minimum number threshold is 10, because there are 9 delta percentiles that satisfy (e.g., are less than or equal to) the 5% maximum delta percentile threshold and that number (e.g., 9) is less than 10, the candidate port may be removed from consideration as a candidate port and its analyzed traffic statistics may be removed from the aggregated n-best list.

The maximum delta percentile threshold and/or the minimum number threshold may be adjusted by a technician of the port server 150. By reducing the maximum delta percentile threshold and/or by increasing the minimum number threshold, the similarity between the traffic statistics of the selected port and the traffic statistics of the candidate port may be increased. Conversely, by increasing the maximum delta percentile threshold and/or by reducing the minimum number threshold, the similarity between the traffic statistics of the selected port and the traffic statistics of the candidate port may be decreased.

The port server 150 may repeat step 454 for each candidate port to remove, based on delta percentile, candidate ports from consideration as a candidate port and its traffic statistics from the aggregate n-best list.

At step 456, the port server 150 may, for each of the selected port and the remaining candidate ports, determine a port direction. As discussed above in connection with FIG. 3, a port may have a forward direction, a reverse direction, or both. A port may have a forward direction if the port is used to either exclusively or predominantly transmit packet data to other devices. A port may have a reverse direction if the port is used to either exclusively or predominantly receive packet data from other devices. A port may have both a forward and reverse directions if the port is used both to transmit packet data to other devices and receive packet data from other devices.

The traffic statistics collected from each port may comprise a first set of traffic statistics specific to the forward direction (e.g., average packet count leaving the port for each interval) and a second set of traffic statistics specific to the second direction (e.g., average packet count being received by the port for each interval). For each direction, the port server 150 may perform a similar analysis as has been discussed above in steps 420-454. For each port and for the forward direction, the port server 150 may generate a waveform (step 430), determine whether there is sufficient port traffic to compare (step 434), and determine correlations (step 436), delta sums (step 438), delta percentiles (step 442), and Euclidean distance (step 444). The port server 150 may also, for the forward direction, rank and filter based on correlation (step 448), delta sum (step 450), Euclidean distance (step 452), and delta percentile (step 454). In such cases, configurable thresholds may be specific to a particular direction (e.g., forward, reverse) and may be different from threshold for the aggregate traffic data (e.g., both forward and reverse).

For example, the port server 150 may determine whether the selected port's traffic and the candidate port's traffic are sufficient to perform comparisons. The port server 150 may determine a traffic sum over the configurable time period (e.g., 24 hours) for each of a given port (e.g., the selected port, the candidate port) in the forward direction and compare each of the traffic sum to a configurable minimum traffic threshold, which may be considered the minimum amount of traffic to perform a comparison. For example, the minimum traffic threshold may be 1,000,000 packets over the time period. If each of the selected port's traffic sum in the forward direction over the time period satisfies the minimum traffic threshold, the port server 150 may determine that there is sufficient traffic data to analyze the traffic statistics for the forward direction. Otherwise, if the candidate port's traffic sum over the time period does not satisfy minimum traffic threshold, there might not be sufficient traffic to analyze the traffic statistics in the forward direction.

In performing comparisons, the port server 150 may account for the fact that outgoing (e.g., forward) traffic from a first port may approximately equal incoming (e.g., reverse) traffic from a second port, and vice-versa. For example, if the port server 150 wishes to compare a forward direction segment (or grouping) of the selected port against a segment (or grouping) of the candidate port, the port server 150 may select a corresponding reverse direction segment (or grouping) for the candidate port. A comparison may be determining overlapping segments to determine whether there is sufficient traffic signal in the forward direction of the selected port and the reverse direction of the candidate port to perform a comparison.

In order for the port server 150 to assign the forward direction to the selected port and a reverse direction to the candidate port, each of the ports should meet the following direction criteria. Each of the ports should have sufficient signal (e.g., overlapping segments) and sufficient traffic (e.g., a traffic sum that satisfied the minimum traffic threshold). Further, the candidate port should have a Euclidean distance less than a technician-configurable minimum Euclidean distance (e.g., 0.09), pass the delta percentile filter (discussed in detail in step 454), and satisfy a technician-configurable Pearson maximum P value correlation threshold (e.g., 0.08). If one of these conditions is not satisfied, the port server 150 might not assign the selected port a forward direction and the candidate port a reverse direction since there is not sufficient data and/or enough correspondence between the ports to perform a directional assignment. Otherwise, if each of these conditions are satisfied, the port server 150 may assign the selected port a forward direction and the candidate port a reverse direction since there is sufficient data and enough correspondence between the ports to perform a directional assignment. A similar analysis may be performed the reverse direction of the selected port and the forward direction of the candidate port.

The port server 150 may assign a port direction for a given port based on the following policies. If the port server 150 determines that the port satisfied the direction criteria for the forward direction but not for the reverse direction, the port server 150 may assign the port a forward direction. If the port server 150 determines that the port satisfied the direction criteria for the reverse direction but not for the forward direction, the port server 150 may assign the port a reverse direction. If the port server 150 determines that the port satisfied the direction criteria for the forward direction and for the reverse direction, the port server 150 may assign the port a "both" direction.

The port server 150 may filter candidate ports based on determined port directions and the fact that the forward direction of the selected port may correspond to the reverse direction of the candidate port, and vice versa. For example, if the port server 150 assigns the selected port a forward direction and not a reverse or both direction, and assigns the candidate port a forward direction and not a reverse or both direction, the candidate port may be removed from consideration as a candidate port since the candidate port was not assigned a reverse direction.

At step 458, the port server 150 may generate a port-to-port mapping for the selected port. For example, the port server 150 may select from the remaining candidate ports. There may be only one remaining candidate port, and the port server 150 may map the selected port to the only remaining candidate port. There may be multiple remaining candidate ports, and the port servers 150 and/or a technician may adjust the various configurable thresholds described herein until only one candidate port remains. The port server 150 may then map the selected port to the remaining candidate port and add the port-to-port mapping (along with its direction) to the port-to-port mapping table. For example, the port server 150 may specify that port 3 of router 152 is connected via a forward direction link to port 3 of transport device 304.

The port server 150 may assign a mapping quality level to the created port-to-port mapping, which may be included in the mapping table. If the port server 150 has sufficient signal in both directions and the port server 150 was able to make a mapping, the port server 150 may assign the port-to-port mapping a high quality level. The port server 150 may have sufficient signal (e.g., overlapping segments) for a candidate port in one direction (e.g., forward direction) but not in the other direction (e.g., reverse direction), and the port server 150 may still map the selected port to the candidate port and may assign the mapping a lower quality level. There may be no remaining candidate ports, and the port server 150 might not make a mapping and may send updated monitoring instructions to the ports to collect traffic data over a new time period.

The port server 150 may compare the port-to-port mapping generated in step 458 with the mapping table to confirm that the ports of the port-to-port mapping do not conflict with other port-to-port mappings in the mapping table. For example, if the generated direct port-to-port mapping for port 3 of the router 152 is to port 3 of the transport device 304 but the mapping table indicate that port 3 of the transport device 304 is directly connected to a port 1 of the transport device 306, the port server 150 may identify the conflict and perform the steps of FIGS. 4A-4E to confirm the conflicting mapping in the mapping table.

The port server 150 may perform an error code ranking. For example, the port server 150 may track which thresholds or other measurement metrics discussed herein are satisfied and which are not satisfied. The port server 150 may assign a unique error code to a traffic statistic not satisfying a particular threshold or metric and include such information in table 700. As a result, a technician may view which thresholds or metrics were not passed. The error codes may correspond to confidence quality levels for various port-to-port mappings.

At step 460, after the port server 150 generates a port-to-port mapping for the selected port, the port server 150 may inject a signal and confirm the port-to-port mapping. For example, the port server 150 may send a signal to the selected port over a particular time period. The port server 150 may send, to the device having the port mapped to the selected port, a request for any signal data received during the particular time period. If the signals match (or substantially match), the port server 150 may confirm the mapping by e.g., increasing the quality level of the mapping in the mapping table.

At step 462, the port server 150 may determine whether there are any remaining ports that have an unknown mapping. The port server 150 may have a list of all ports in the transport system 300 and compare that list with the mapping to table to see if there are any ports on the list that are not on the mapping table. If there are ports on the list that are not on the mapping table, the port server 150 may return to step 428 and select a new port having unknown mapping and repeat the steps of 430-462 until all ports have been mapped.

The method of FIGS. 4A-4E may be periodically repeated any number of times on the same system or for different system to account for changes technicians make to the systems over time. For example, the method of FIGS. 4A-4E may be repeated every day. Additionally and/or alternatively, the method of FIGS. 4A-4E may be performed in response to receiving an indication that an unknown change has been made to a system. For example, a network administrator may suspect that a change has been made, but not know the specifics of the change, and may initiate the method of FIGS. 4A-4E. As such, by using the system and methodologies described herein, a system's port-to-port mappings may be automatically discovered and maintained to provide more reliable communications within the system.

The descriptions above are merely examples of various concepts. They may be rearranged/divided/combined as desired, and one or more components or steps may be added or removed without departing from the spirit of the present disclosure. For example, some of the steps of the FIGS. 4A-4E may be reordered and/or omitted. As a particular example, the port server 150 may, for each candidate port and for each of the forward and reverse direction, obtain analyzed traffic statistics by performing the steps of FIG. 4D. The port server 150 may then, for each of the forward and reverse directions, rank of the ports based on correlation and select only one (e.g., the best matching) candidate port for the aggregated-best list. The port server 150 may remove each of the other candidate ports from consideration. For the best candidate port, the port server 150 may determine whether the candidate port meets particular metrics (e.g., sufficient signal, sufficient overlapping signal, satisfy various thresholds discussed herein, etc.). If so, the port server 150 may make the mapping assignment. Otherwise, if the best candidate port does not meet one or more of these metrics, the port server 150 may output of a table of results (e.g., table 700) to permit the technician view the analyzed statistics and determine which if any ports should be matched with the selected port.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a computing device and from a first routing device, a first set of average total packet counts collected over a time period at a first interval for a first port of the first routing device;
receiving, by the computing device and from a network server, a second set of average total packet counts collected over the time period at a second interval for a second port of a second routing device;
determining, by the computing device, a distance between the first set of average total packet counts and the second set of average total packet counts, wherein the distance is based on:
a delta sum based on a sum of the first set of average total packet counts and a sum of the second set of average total packet counts; and
a first delta percentile based on:
a first average total packet count, of the first set of average total packet counts, corresponding to a first percentile of the first set of average total packet counts; and
a second average total packet count, of the second set of average total packet counts, corresponding to the first percentile of the second set of average total packet counts; and
storing, by the computing device and based on the distance, a mapping of the first port to the second port.

2. The method of claim 1, further comprising:
determining, by the computing device, the delta sum by dividing a difference between the sum of the first set of average total packet counts and the sum of the second set of average total packet counts by the sum of the first set of average total packet counts.

3. The method of claim 1, wherein storing the mapping of the first port to the second port comprises replacing a second mapping of the first port to a third port.

4. The method of claim 1, wherein storing the mapping of the first port to the second port is further based on determining that a second mapping for the first port is missing.

5. The method of claim 1, wherein the distance is further based on a second delta percentile based on:
a third average total packet count, of the first set of average total packet counts, corresponding to a second percentile of the first set of average total packet counts; and
a fourth average total packet count, of the second set of average total packet counts, corresponding to the second percentile of the second set of average total packet counts.

6. The method of claim 5, wherein the determining the distance is determined by performing a square root of a sum of at least two of:
a square of the delta sum,
a square of the first delta percentile, or
a square of the second delta percentile.

7. The method of claim 1, further comprising:
generating, by the computing device, a first waveform and a second waveform as a function of average total packet count and time, wherein the first waveform is based on the first set of average total packet counts and the second waveform is based on the second set of average total packet counts,
wherein the storing the mapping of the first port to the second port is further based on determining a correlation between the first waveform and the second waveform.

8. The method of claim 1, further comprising:
grouping, by the computing device and based on the first interval and the second interval, one or more average total packet counts of the first set of average total packet counts to align with an average total packet count of the second set of average total packet counts.

9. The method of claim 1, further comprising:
receiving, by the computing device and from the network server, a third set of average total packet counts collected over the time period at the second interval for a third port of the second routing device;
determining, by the computing device, that an average total packet count of the third set of average total packet counts is missing or a null value;
determining a corresponding port associated with the third port; and
adding an average total packet count associated with the corresponding port to the third set of average total packet counts.

10. A method comprising:
receiving, by a computing device and from a first routing device, a first set of average total packet counts collected over a time period at a first interval for a first port of the first routing device;
receiving, by the computing device and from a network server, a second set of average total packet counts collected over the time period at a second interval for a second port of a second routing device;
grouping, by the computing device and based on the first interval and the second interval, one or more average total packet counts of the first set of average total packet counts to align with an average total packet count of the second set of average total packet counts;
determining, by the computing device, a delta sum by dividing a difference between a sum of the first set of average total packet counts and a sum of the second set of average total packet counts by the sum of the first set of average total packet counts;
determining, by the computing device and based on the delta sum, a distance between the first set of average total packet counts and the second set of average total packet counts; and
storing, by the computing device and based on the distance, a mapping of the first port to the second port.

11. The method of claim 10, wherein storing the mapping of the first port to the second port comprises replacing a second mapping of the first port to a third port.

12. The method of claim 10, wherein storing the mapping of the first port to the second port is further based on determining that a second mapping for the first port is missing.

13. The method of claim 10, wherein the distance is further based on a first delta percentile based on:
a first average total packet count, of the first set of average total packet counts, corresponding to a first percentile of the first set of average total packet counts; and
a second average total packet count, of the second set of average total packet counts, corresponding to the first percentile of the second set of average total packet counts.

14. The method of claim 13, wherein the determining the distance is determined by performing a square root of a sum of at least:
a square of the delta sum, and
a square of the first delta percentile.

15. The method of claim 10, further comprising:

generating, by the computing device, a first waveform and a second waveform as a function of average total packet count and time, wherein the first waveform is based on the first set of average total packet counts and the second waveform is based on the second set of average total packet counts, wherein the storing the mapping of the first port to the second port is further based on determining a correlation between the first waveform and the second waveform.

16. A method comprising:

receiving, by a computing device and from a first routing device, a first set of average total packet counts collected over a time period at a first interval for a first port of the first routing device;

receiving, by the computing device and from a network server, a second set of average total packet counts collected over the time period at a second interval for a second port of a second routing device;

determining, by the computing device, a distance between the first set of average total packet counts and the second set of average total packet counts;

generating, by the computing device, a first waveform and a second waveform as a function of average total packet count and time, wherein the first waveform is based on the first set of average total packet counts and the second waveform is based on the second set of average total packet counts;

determining a correlation between the first waveform and the second waveform, wherein the correlation is based on a similarity of a shape of the first waveform with a shape of the second waveform; and storing, by the computing device and based on the distance and the correlation, a mapping of the first port to the second port.

17. The method of claim 16, further comprising:

determining, by the computing device, a delta sum by dividing a difference between a sum of the first set of average total packet counts and a sum of the second set of average total packet counts by the sum of the first set of average total packet counts, wherein the distance is based on the delta sum.

18. The method of claim 16, wherein storing the mapping of the first port to the second port comprises replacing a mapping of the first port to a third port.

19. The method of claim 16, wherein storing the mapping of the first port to the second port is further based on determining that a second mapping for the first port is missing.

20. The method of claim 16, further comprising:

receiving, by the computing device and from the network server, a third set of average total packet counts collected over the time period at the second interval for a third port of the second routing device;

determining, by the computing device, that an average total packet count of the third set of average total packet counts is missing or a null value;

determining a corresponding port associated with the third port; and adding an average total packet count associated with the corresponding port to the third set of average total packet counts.

* * * * *

UNITED STATES PATENT AND TRADEMARK OFFICE
CERTIFICATE OF CORRECTION

PATENT NO. : 10,958,502 B2
APPLICATION NO. : 16/246014
DATED : March 23, 2021
INVENTOR(S) : Balasubramanian Ramachandran et al.

It is certified that error appears in the above-identified patent and that said Letters Patent is hereby corrected as shown below:

In the Specification

Detailed Description, Column 5, Line 33:
Please delete "210" and insert --209--

Detailed Description, Column 5, Line 34:
Delete "209." and insert --210.--

Detailed Description, Column 5, Line 35:
Delete "210" and insert --209--

Detailed Description, Column 5, Line 37:
Delete "210" and insert --209--

Detailed Description, Column 5, Line 39:
Delete "209." and insert --210.--

Detailed Description, Column 5, Line 39:
Delete "209" and insert --210--

Detailed Description, Column 20, Line 32:
Delete ""SF"" and insert --"SP"--

Signed and Sealed this
Fourteenth Day of March, 2023

Katherine Kelly Vidal
*Director of the United States Patent and Trademark Office*